B. L. WEVER.
COOKING UTENSIL.
APPLICATION FILED DEC. 13, 1921.
1,422,156.
Patented July 11, 1922.
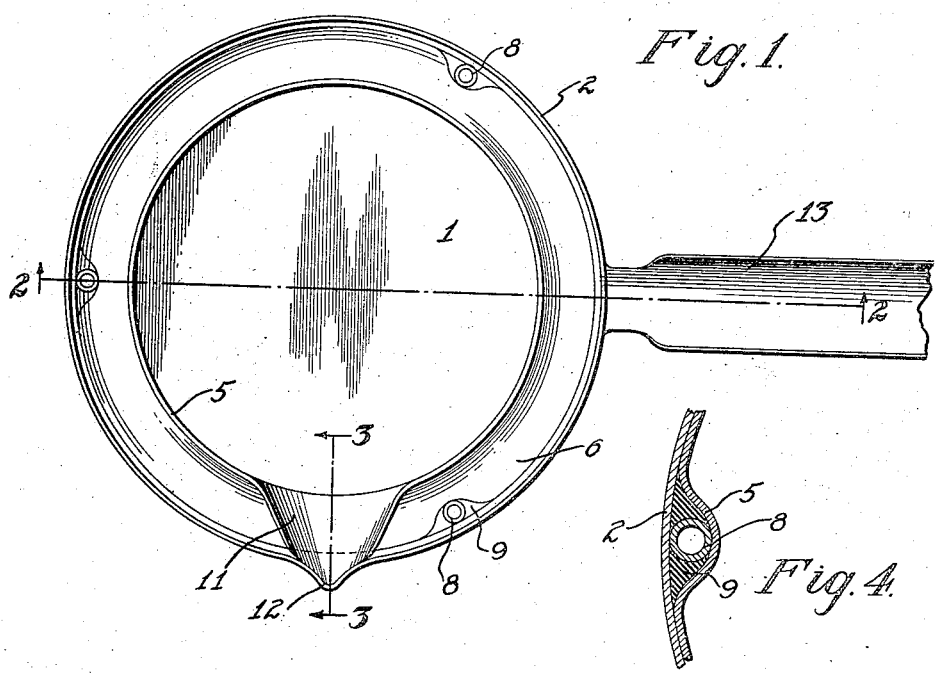
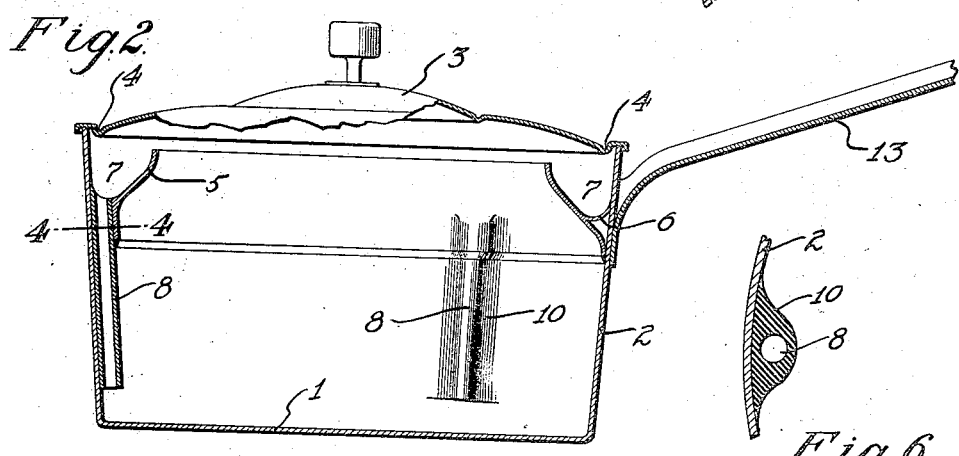
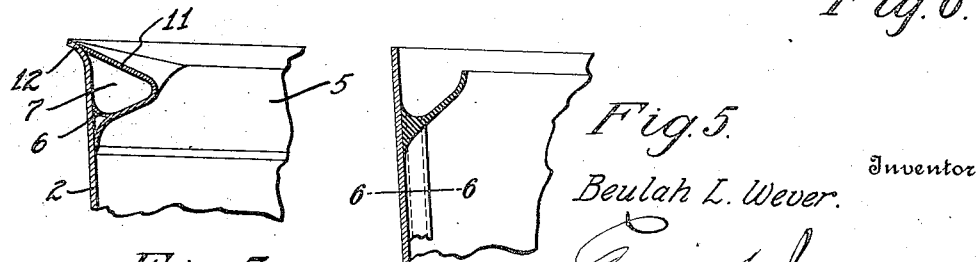
Inventor
Beulah L. Wever.

UNITED STATES PATENT OFFICE.

BEULAH L. WEVER, OF SAVANNAH, GEORGIA.

COOKING UTENSIL.

1,422,156. Specification of Letters Patent. Patented July 11, 1922.

Application filed December 13, 1921. Serial No. 522,115.

*To all whom it may concern:*

Be it known that I, BEULAH L. WEVER, a citizen of the United States, residing at Savannah, in the county of Chatham and State of Georgia, have invented certain new and useful Improvements in Cooking Utensils, of which the following is a specification, reference being had therein to the accompanying drawing.

This invention comprises an improved cooking utensil. It is contemplated among its objects to provide a vessel with means for preventing the boiling over of liquids contained therein; to dispose these means upon the inner surface of the vessel in a way which will leave the center space free and which will occupy only a small space in the upper inner surface of the vessel at a point which is usually unoccupied, as distinguished from devices which are placed on the bottom of the vessel or protrude from the inner sides in such a way as to materially decrease the holding capacity of the vessel. Another object contemplated is the provision of a vessel of this kind wherein there will be no joints or crevices in which particles of food or the like might lodge, all the connections being smooth and easily accessible for cleaning.

When an article of any size is placed upon the bottom of a cooking utensil within liquid which is brought to a boil, the article tends to direct the upwardly moving liquid outwardly toward the upper edge of the vessel and against the outer edges of the lid. This raises the lid and causes boiling over of the liquid. By the present invention there is provided an inwardly flaring gutter or flange, arranged around the upper inner surface of the vessel. This acts as a baffle to the upwardly moving liquids, directing them against the center of the lid from which they fall back into the interior of the gutter or trough formed by the flange and from this they are carried downwardly to the bottom of the vessel by channels or tubes placed in communication with the gutter. In this way a circulation of the liquid is effected which keeps a stream playing around and between the bottom of the vessel and the article being boiled, and keeps the temperature from mounting above a certain point due to the cooling of the liquid coming in contact with the top of the vessel and falling back into the groove or gutter. It has been found in actual practice that this arrangement prevents raising of the lid, boiling over of the contents of the vessel and the sticking to the bottom of the article being boiled. Other objects and advantages will in part be apparent and in part brought out more fully in the description which follows:

A drawing illustrating an embodiment of the invention is hereto annexed, the following views being shown:

Figure 1 is a view in top plan;

Fig. 2 is a view in vertical section on the line 2—2 of Fig. 1;

Fig. 3 is a view in fragmentary detail on the line 3—3 of Fig. 1; and

Fig. 4 is a similar view on the line 4—4 of Fig. 2;

Fig. 5 is a view in vertical section of another form of tube and connection; and Fig. 6 is a view in transverse section thereof on the line 6—6 of Fig. 5.

In these views, the reference-character 1 designates a bottom and 2 a side portion of a cooking utensil or vessel, having an open end adapted to be closed by a cover 3. This cover has an inner surface which is raised above the plane of the upper edge of the side of the vessel, in the form of a curve, and has arranged around its periphery an inwardly and downwardly directed flange 4 outside of which a portion of the top is adapted to seat on the upper edge of the vessel.

Arranged around the upper inner surface of the side 2 there is a flange 5, having its lower surface beveled to form a close joint with the inner surface of the vessel and prevent lodgment of food particles or the like. This lower portion of the flange is secured to the inner surface of the vessel, from which point the flange is directed inwardly in a gradually increasing curve so that the upper portion of the flange is in spaced relation to the upper edge of the side of the vessel. The flange is again connected with the side of the vessel by a lip 6 extending around the base of the flange and forming, with the side and flange, a gutter or channel 7, the connections being such that there is a smooth unbroken interior which may be readily cleaned and which will not hold food particles or the like. The function of this flange is to direct upwardly moving liquids toward the center of the lid, where, due to the shape of the lid, and the flange 4 thereon, these liquids will be first of all prevented from striking along the outer edge of the lid, and will be directed gradually into the interior or bottom of the gutter or channel 7 formed by the flange and side of the vessel.

Means are provided for carrying the liquid, so directed, to the bottom of the vessel, and as here shown there are arranged a plurality of tubes, conduits or channels 8 spaced-apart around the gutter and so connected with the sides and bottom of the gutter as to leave no place for lodgment of food particles and present smooth surfaces for cleaning. In the present instance, this is effected by moving the bottom portion of the flange 5 inwardly at the point where the tube 8 is to be placed, as shown in Fig. 4, and filling the space remaining with solder or the like 9. In order to provide smooth surfaces around the tubes and between them and the side of the vessel, solder or the like 10 is smoothed off from the sides of the tubes to the inner side of the vessel, as shown in Figs. 2 and 5. This insures a smooth surface for cleaning and prevents lodgment of food particles. A brush may be used for cleaning the interior of the tubes, access being readily had thereto when the cover is removed from the vessel.

At one point, the flange is flared outwardly, as at 11, and connected to a lip 12 to constitute a spout for pouring, as best seen in Figs. 1 and 3, and a handle 13 of any suitable construction is also provided. In Figs. 5 and 6 there is shown a construction wherein tubes 8 are constructed of block material such as aluminum, bored, and the sides 10 shaved or planed off, as indicated in Fig. 6, so as to form a smooth uninterrupted surface, with the inner surface of the pot. The tube, in this instance, is welded to the side of the pot, thus eliminating solder and the danger of its running when exposed to extreme heat.

When this construction is used, the gutter is provided with an opening, shown in dotted lines in Fig. 5, which registers with the opening in tube 8, and the upper surface of the tube is shaped to conform with the under surface of the gutter and be securely welded thereto. When so constructed, the pot, gutter and tube become a unitary structure, free from ridges or broken places wherein food might lodge, and when welded together all danger of solder connections becoming loosened by overheating is eliminated.

When an article is placed in the vessel and liquid for boiling, movement of the liquid upwardly due to boiling will be met by the inwardly-flared portion of flange 5, which will direct the liquid toward the center of the lid and at its upper portion instead of at the outer edge. From this point, the liquid, slightly cooled, will be directed to the gutter formed between the top of the flange and the top of the vessel, and then carried downwardly by tubes 8, to the bottom of the vessel. Here it moves inwardly around and between any articles on the bottom of the vessel, preventing sticking, and the circulation is continued, as described.

From the foregoing, it will be apparent that the present invention meets and accomplishes the objects set forth, and while it has been disclosed in the present embodiment, it will be understood that I do not wish to be limited to the precise form of this disclosure, as many changes are contemplated to be within its scope, as set forth in the claims.

What I claim is:

1. A cooking utensil comprising a bottom and side portion arranged to form a vessel, an inwardly-flaring flange disposed on the upper, inner portion of the side to constitute a gutter around the upper inner edge of the vessel and leave a clear interior cooking space for articles to be cooked within the vessel, and a duct leading from the interior of the gutter to the lower portion of the interior cooking space within the vessel.

2. A cooking utensil comprising a bottom and side portion arranged to form a vessel, an inwardly-flaring flange disposed on the upper, inner portion of the side to constitute a gutter around the upper inner edge of the vessel and leave a clear space for articles to be cooked within the vessel, a duct leading from the interior of the gutter to the lower portion of the vessel, and a lip formed on a portion of the flange and extending outwardly to constitute a spout.

3. A cooking utensil comprising a bottom and side portion arranged to form a vessel, an inwardly flaring flange disposed on the upper inner surface of the side portion, said flange being secured, at its lower edge, to the side of the vessel, the upper edge of the flange extending inwardly slightly and leaving a clear interior cooking space within the vessel, a lip connecting the flange, at a point intermediate its upper and lower edges, with the side of the vessel, and constituting, with a portion of the flange and side, a gutter extending around the upper inner portion of the side, said flange and lip having smooth surfaces to prevent lodgment of particles of food between the flange and the side of the vessel, and a duct leading from the gutter to the lower interior cooking space of the vessel.

4. A cooking utensil comprising a side and bottom portion arranged to form a vessel and normally open at the top, an inwardly-flaring flange connected to the side at the lower portion of the flange and in spaced relation to the side at the upper portion of the flange to constitute a gutter extending around the upper interior surface of the vessel, a duct extending from the interior of the gutter to the lower portion of the vessel, a spout formed on the flange, and a top having a downwardly-extending flange adapted to direct upwardly rising liquids into the gutter.

In testimony whereof I affix my signature in presence of two witnesses.

BEULAH L. WEVER.

Witnesses:
   JULIA A. LEBEY,
   SAM STEINBERG.